Figures 1, 2, 3:
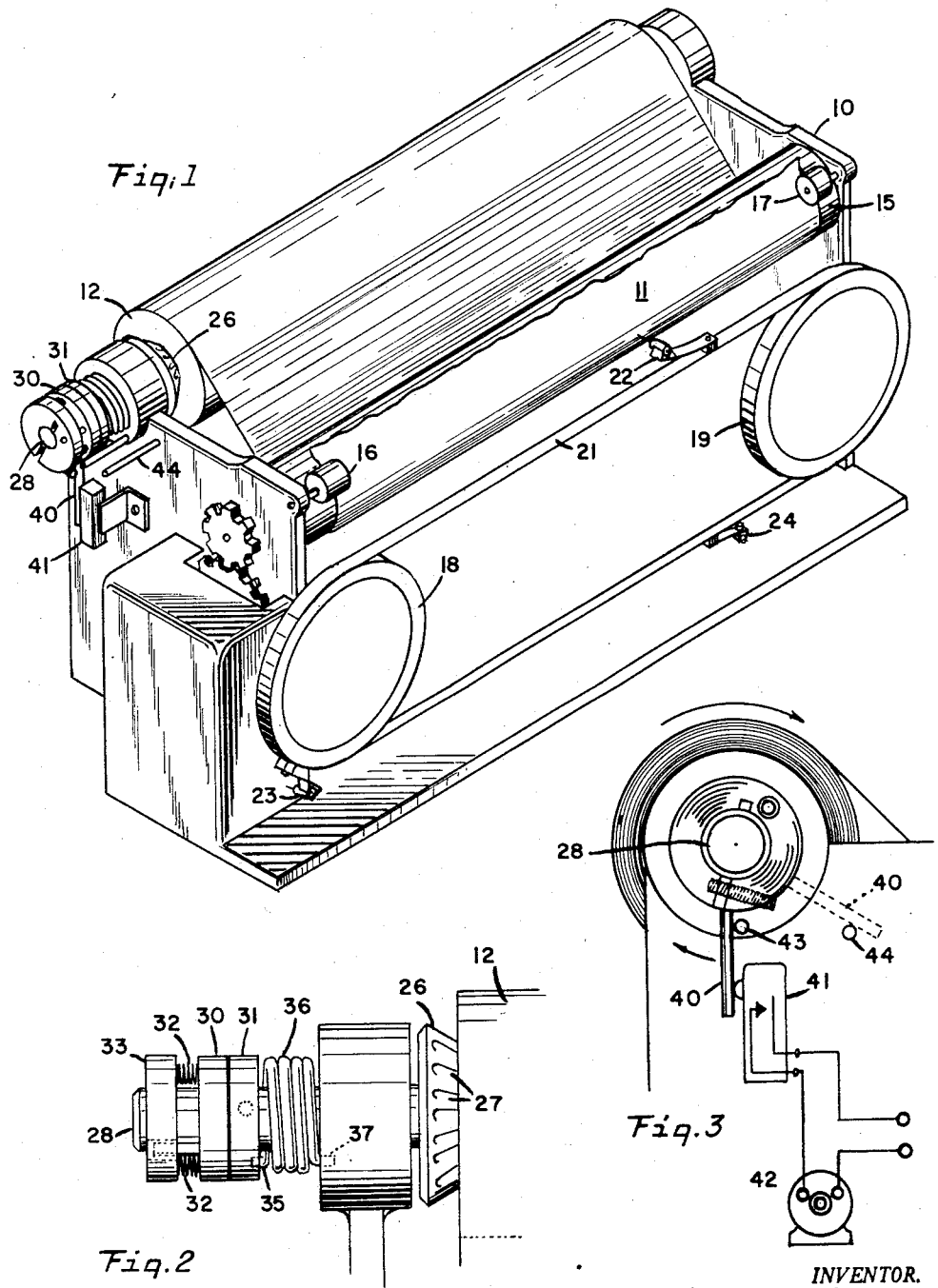

April 28, 1959  H. SANDROCK  2,884,299
WEB CONTROL FOR FACSIMILE RECORDER
Filed March 27, 1958

INVENTOR.
Harold Sandrock
BY

2,884,299

WEB CONTROL FOR FACSIMILE RECORDER

Harold Sandrock, Flushing, N.Y., assignor to Times Facsimile Corporation, New York, N.Y., a corporation of New York Application March 27, 1958, Serial No. 724,400

8 Claims. (Cl. 346—136)

This invention relates to facsimile recorders of the web or continuous type, and more particularly to an arrangement for controlling the recording or other function when the web is ruptured or the paper supply roll becomes exhausted.

In facsimile and other types of recorders employing a continuous web of recording paper, the recorder starts and feeds the recording medium automatically, and operates without attention for considerable periods of time. If while the recorder is unattended, the web of paper is torn or the roll is exhausted, it is desirable to stop the recorder and/or the paper feeding mechanism. This is particularly important where the end of the paper on the inside of the roll is creased or has an attached adhesive strip used for attaching the end of the web of paper to the core. In many recorders, the creased or thickened end of the paper if drawn through the recording mechanism will damage the elements of the mechanism such as the recording stylus or point.

It is the object of the invention therefore, in general terms, to provide an improved arrangement for stopping the recorder when the end of the paper is reached and the paper supply roll is exhausted.

A further object of the invention is to effect the same result if the web of recording paper is torn or ruptured accidentally during the operation of the recorder.

Another object of the invention is to provide a control mechanism of the character described which does not require any adjustment or attention to put it into operating condition, but is automatically set by the operation of reloading the recorder with paper.

Another object of the invention is to provide a simple combined attachment for tensioning the web of paper in a web-type or continuous recorder and for stopping the recorder when the supply of paper is exhausted.

Other objects and advantages of the invention will appear from the following description of the preferred embodiment thereof shown in the accompanying drawing, wherein Fig. 1 is a perspective view of a web-type or continuous facsimile recorder showing the web control and tensioning device associated with the pivoted support for the paper supply roll; and Figs. 2 and 3 are front and end views to an enlarged scale of the web control and tensioning arrangement shown in Fig. 1.

Referring to the drawing, a facsimile recorder 10 is shown which is of the so-called continuous or web type. Recorders of this type are adapted to record on a strip of recording paper 11 of considerable length, usually fed from a supply roll 12 in the recorder containing sufficient paper for many hours of operation. A continuous recorder of this general type is shown for example in the prior patent of A. G. Cooley, No. 2,814,547, granted November 26, 1957 and assigned to the assignee of the present application. The disclosure of this prior patent is hereby incorporated by reference in the present disclosure and only so much of the construction and operation of a conventional recorder of this type will be set forth herein as is required for an understanding of the present invention.

As shown, the web of paper 11 is adapted to be drawn or fed through the recording mechanism by the driven feed roller or platen 15 against which the paper is pressed by the rotatable rubber friction rollers 16 and 17. Any other suitable paper feed arrangement may, of course, be employed in lieu of that illustrated in the drawing.

The recording mechanism may be similar to that shown in said prior patent mentioned above and consists essentially of two spaced pulleys or wheels 18 and 19 carrying a stylus band 21 which supports the stylus or marking assemblies 22, 23 and 24 in operative relation to the recording web 11. The recording mechanism shown is merely illustrative and does not constitute any part of the present invention. However it is in connection with marking assemblies of the stylus or needle type illustrated that the invention has particular significance, as will be explained.

The paper supply roll 12 is gripped between two pivoted members 26, of generally conical shape, one of which is illustrated in detail in Fig. 2. The rotatable supporting members 26 engage the ends of the core on which the recording paper 11 is wound and said members may be provided with grooves or ridges 27 in order to key or attach the supporting shaft 28 for rotation with the paper supply roll 12. Ordinarily one of the supporting cones 26 is slidably mounted in the end frame of the machine and is held firmly in engagement with the supply roll by an axial spring (not shown) to facilitate insertion or removal of the roll.

In a recorder of this type it is desirable to maintain the web of paper under tension so that it may be guided in a straight line and be wrapped smoothly around the driven feed roller 15. It is also desirable in a recorder having electrical recording mechanism of the stylus type to stop or shut off the recording mechanism when the paper roll is exhausted or in case the web of paper is torn or ruptured accidentally during the operation of the machine. In accordance with the principal feature of the invention, a simple combined tensioning and control unit is provided in association with the paper supply roll support for both maintaining the desired tension in the web and for controlling the paper feed and/or the recording mechanism when the web is ruptured or the supply roll is exhausted.

As shown more clearly in Figs. 2 and 3, the rotatable shaft 28 which is keyed to the left hand cone 26 and to the supply roll 12 carries two contacting collars or discs 30 and 31 forming a slip friction clutch. The disc or collar 30 rotates with the shaft 28 and is spring-pressed against the disc or collar 31, as by means of springs 32 bearing against the fixed collar 33 on the shaft 28. The disc or collar 31 on the other hand is journaled on the shaft 28 and is provided with a notch or recess on the inside which is adapted to receive the offset end 35 of a coiled spring 36, the other end of which is secured to the fixed frame of the machine as indicated at 37. The disc or collar 31 which turns on the shaft 28 through a limited angle to place the spring 36 under tension is also provided with a radial arm or lug 40 (see Fig. 3).

A microswitch or similar control element 41 is mounted on the frame of the recorder below the shaft 28 and in a position to be engaged by the radial arm 40. The electrical switch 41 is intended to illustrate a typical form of control device of which any suitable kind may be employed depending on the particular application of the invention. Where a switch is used the contacts may be arranged in the circuit of a motor 42 which operates the recording or feed mechanism and also may cut off the supply of current to the recording assemblies 22, 23 and 24.

With the arrangement described, it will be obvious that feeding of the web 11 from the supply roll 12 will turn the disc or collar 31 through frictional engagement with the disc or collar 30, thereby turning the radial arm 40 in a clockwise direction as shown in Fig. 3, against the torsional force of the spring 36. When the paper is loaded in the machine by mounting the paper roll 12 on its pivoted supports 26 and threading the outer end of the paper around the driven feed roll 15, it will be apparent that the actuator arm 40 is turned away from the switch 41, thereby rendering the recording mechanism operative or in readiness to be started. The feeding of the paper rotates the disc 30 which causes the disc or collar 31 to continue to turn in a clockwise direction (as shown in Fig. 3) and place the coiled spring 36 under tension. Stops 43 and 44 are preferably provided as shown in Fig. 3 to not only limit the rotation of the collar 31 in the clockwise direction, but also permit the spring 36 to be initially under tension without subjecting the microswitch 41 to excessive pressure. The spring 36 acting through the friction clutch thus produces a constant frictional drag or tension on the web 11.

When the paper on the supply roll 12 becomes exhausted it will slip or be pulled loose from the core by the paper feeding mechanism. This removes the torque exerted on the shaft 28 and friction disc 30, and the spring 36 returns actuator arm 40 to the position shown in full lines in Fig. 3, thus operating the switch or control element 41 to shut off the recording mechanism and the paper feed. The same result is effected in case the web of paper 11 is accidentally ruptured during operation of the recorder.

Normally the end of the paper next to the core is creased or uneven and may have attached to it a strip of adhesive tape or the like which is used to fasten the paper to the core during manufacture. In this case it is essential that the feed of the paper strip 11 be stopped before the creased or thickened portion at the end of the sheet reaches the recording mechanism to avoid damaging the recording needles or even the stylus band 21. It will be seen that in accordance with the invention this is readily accomplished by the described attachment associated with the pivoted support for the supply roll, and this device also serves to tension the paper web.

With this arrangement there is the further advantage that the means of controlling paper feed does not depend on any contact with the recording paper itself, thus avoiding any damage thereto.

Various modifications in the illustrative embodiment of the invention which has been described in detail may be made without departing from the scope of the invention.

I claim:

1. A facsimile recorder of the character described comprising, in combination, recording mechanism, a paper supply roll, means for feeding a web of paper from said supply roll through said recording mechanism, a pivoted actuating member turning on the axis of said paper supply roll and means including said actuating member for stopping the paper-feeding means when the web of paper is accidentally ruptured or the roll is exhausted.

2. A facsimile recorder of the character described comprising, in combination, recording mechanism, a paper supply roll, means for feeding a web of paper from said supply roll through said recording mechanism, means including a pivoted shaft keyed to said supply roll for rotatably supporting said roll, means including a slip friction clutch on said shaft for maintaining said web of paper normally under tension and means including said last-mentioned means for stopping said paper-feeding means if said web of paper is accidentally ruptured or the paper supply roll is exhausted.

3. A facsimile recorder of the character described comprising, in combination, recording mechanism, a paper supply roll, means for feeding a web of paper from said supply roll through said recording mechanism, means including a pivoted shaft keyed to said supply roll for rotatably supporting said roll, a collar journalled on said shaft, a torsion spring secured at one end thereof to said collar and means including said collar and torsion spring for detecting breakage of said web of paper.

4. A facsimile recorder of the character described comprising, in combination, recording mechanism, a paper supply roll, means for feeding a web of paper from said supply roll through said recording mechanism, means including a pivoted shaft keyed to said supply roll for rotatably supporting said roll, a collar journalled on said shaft, a spring engaging said collar and means including said collar and spring for normally maintaining tension in said web of paper and for detecting exhaustion of the paper roll.

5. A facsimile recorder according to claim 4, in which said means for maintaining tension in the web includes a second collar in frictional contact with the first-mentioned collar, said second collar being secured to said shaft.

6. A facsimile recorder according to claim 5, in which means is provided to stop the recorder mechanism when the paper supply roll is exhausted, said last-mentioned means including an electric switch and a switch actuating pin or lug secured to said first-mentioned collar.

7. In a web-type recorder using a continuous web of recording paper, in combination, recording mechanism, a paper supply roll, means to advance the web of paper from said supply roll to said recording mechanism and thereby tension said web to cause rotation of said supply roll, a pivoted actuating member, means to turn said actuating member by the rotation of said supply roll and means including said actuating member for stopping said paper-advancing means in response to a change from the normal web tension.

8. A web-type recorder according to claim 7, in which the means for stopping said paper-advancing means is responsive to accidental rupture of the web of paper and to the loss of web-tension when the paper supply roll becomes exhausted.

References Cited in the file of this patent

UNITED STATES PATENTS 2,715,360    Brown    Aug. 16, 1955
2,744,174    Martin    May 1, 1956